United States Patent [19]

Williams

[11] Patent Number: 4,948,351
[45] Date of Patent: Aug. 14, 1990

[54] PRESSURE SEWER PUMPING SYSTEM WITH CHECK VALVE ARRANGEMENT

[76] Inventor: Richard L. Williams, 9180 Parker Rd., Harrod, Ohio 45850

[21] Appl. No.: 323,957

[22] Filed: Mar. 15, 1989

[51] Int. Cl.$^5$ ............................................. F04B 21/02
[52] U.S. Cl. .................................... 417/565; 277/177
[58] Field of Search .................. 417/565, 567, 40, 41; 277/177, 173, 168, 169

[56] References Cited

U.S. PATENT DOCUMENTS

| | | | |
|---|---|---|---|
| 16,202 | 12/1856 | Underwood | 277/173 |
| 88,371 | 3/1869 | Greuzbaur | 277/173 |
| 137,680 | 4/1873 | Hobbs | 417/565 |
| 207,871 | 9/1878 | Horton et al. | 277/173 |
| 225,488 | 3/1880 | Pease | 277/177 |
| 391,956 | 10/1888 | Frager et al. | 73/249 |
| 1,739,838 | 12/1929 | Johnson | 417/565 |
| 2,314,683 | 3/1943 | Berry | 277/177 |
| 2,317,034 | 4/1943 | Dalkin | 277/173 |
| 2,386,485 | 5/1943 | Longenecker | 417/565 |
| 2,657,639 | 11/1953 | Roberg | 417/565 |
| 2,864,660 | 12/1958 | Seubert, Jr. | 277/173 |
| 3,116,932 | 7/1961 | Mallinckrodt | 277/173 |
| 3,514,231 | 5/1970 | Belden | 417/565 |
| 4,348,924 | 9/1982 | Wood | 417/40 |
| 4,418,924 | 12/1983 | Mack | 277/177 |

FOREIGN PATENT DOCUMENTS 254221 9/1926 Italy ...................................... 417/567

OTHER PUBLICATIONS

Design Manual for Pressure Sewer Systems.

*Primary Examiner*—Leonard E. Smith
*Assistant Examiner*—Robert N. Blackmon
*Attorney, Agent, or Firm*—Jeffers, Hoffman & Niewyk

[57] ABSTRACT

A sewage pumping system for use in residential sewer systems. The pumping system includes a sump, a intake conduit, a discharge conduit, and a pump for pumping sewage from the sump through the intake into discharge conduits. The pump is a piston type pump with rolling resilient O-rings received between the piston and cylinder. Four check valves are provided, two of which are located in the intake conduit and two of which are located in the discharge conduit. The check valves in the intake conduit are spaced apart approximately 1 to 4 feet and the check valves and the intake conduit are also spaced apart approximately 1 to 4 feet. The check valves insure that the flow through the conduits is unidirectional and the spacing of the check valves insures that they will not be both wedged in the open position by passage of debris therethrough.

12 Claims, 2 Drawing Sheets

PRESSURE SEWER PUMPING SYSTEM WITH CHECK VALVE ARRANGEMENT

BACKGROUND OF THE INVENTION

This invention relates to residential sewage pumping systems for use in discharging sewage from a source of origin, such as a residence, into a sewer main.

In urban environments, residential sewage is generally discharged from a residence through a gravity fed system into a sewer main. Thus the slope of the system conduits is continuously downward from the residence to the sewer main. Such systems are not only expensive to install but are sometimes impossible to install in hilly terrain without the use of lift pumps to lift the sewage from one point in the system to another.

Other residential sewage systems, most commonly those used in suburban or rural environments, use septic systems. Such residential sewage systems include a septic tank and a dry well or drain field for disposing of the excess waste water. Such systems cannot be used in all locations due to rocky soil, heavy non-absorbent soil, or due to environmental considerations.

Still other residential installations have used pressure sewer systems. Pressure sewer systems discharge the sewage from a residence and the like by means of a pump to a common force main or to a gravity main located in the street. Such pressure sewer systems have commonly used effluent pumps or grinder pumps, both of which use an impeller with a plurality of vanes to transport the sewage under pressure from an inlet conduit to an outlet conduit. Grinder pumps differ from effluent pumps in that they additionally have a cutting element to grind or comminute the sewage prior to pumping the sewage. Grinder pumps have not been satisfactory since they require extremely high maintenance, especially with regard to the cutting elements. Furthermore, the cutting elements tend to clog if the sewage contains cigarette filters, plastic straws or other plastic non-soluble items such as panty hose, or infant diaper moisture barriers.

Another problem with such systems is that vane type pumps are limited in the amount of lift which they can provide. Commonly, such systems are limited to providing to forty (40) feet of lift. If it is attempted to increase the lift generated by such vane type pumps, the seals of the pumps tend to fail due to excessive pressure generated in the pumps, thereby resulting in expensive repairs. Even without excessive pressures in the system, another problem with such pressure type sewer systems has been that pump maintenance has been relatively expensive. The seals of the system tend to wear out after a period of use and replacement of the seals requires disassembly of the pumps.

Another problem with prior art pressure sewer systems has been that the check valves used in the system are subject to becoming stuck, thereby causing complete failure of the system. Commonly such prior art pressure sewer systems include a single check valve to isolate the system from the force sewer main or gravity sewer main. It is possible that large debris, such as for instance, infant diapers, may become lodged in the check valve, thereby completely disabling the system and requiring clearing of the check valve.

It is therefore desired to provide a residential pressure type sewer system which is relatively inexpensive to maintain, which provides a substantial amount of lift, and wherein the pump is inexpensive to maintain and not subject to failure. Furthermore, it is desired to provide such a system wherein the size of the solids which can be handled by the system is substantially greater than in the prior art systems.

Lastly, it is desired to provide a system wherein the check valves are not subject to being disabled whereby the system will continue to function even though one of the check valves may be stuck in the open position.

SUMMARY OF THE INVENTION

The present invention provides a residential sewage pumping system which overcomes the disadvantages of the above described prior art sewage systems by providing an improved pressure sewer system therefore.

The pressure sewer system according to the present invention, in one form thereof, includes a piston pump having an inlet and an outlet, an intake conduit connecting the inlet to a sump, a discharge conduit connecting the outlet to a sewer main and four check valves. Two of the check valves are connected in the intake conduit and two of the check valves are connected in the discharge conduit.

The present invention further provides a pressure sewer system including a piston pump having a cylinder and piston with a rolling resilient ring seal disposed between the cylinder wall and the piston so that, as the piston travels in the cylinder, the ring will rotate and roll between the cylinder wall and the piston to provide a seal therebetween. The cylinder has an inlet to which an intake conduit is connected. The cylinder also has an outlet to which a discharge conduit is connected. The intake conduit is connected to a sump in which sewage is collected. Two check valves are provided in the intake conduit. The check valves are separated by a predetermined distance to prevent a single piece of debris from keeping both intake check valves in the open position. Two further check valves are located in the discharge conduit and these check valves are also separated by a predetermined distance to prevent a single piece of debris from keeping these check valves stuck in the open position.

An advantage of the present invention is that the system can handle much larger solid debris than was possible with prior art systems.

Another advantage of the present invention is that the system pump does not include cutting elements which are subject to failure and require high maintenance.

A still further advantage of the present invention is that the system generates substantially more head or pressure than prior art grinder pump systems so that the system may be used in a great many more applications than was possible for prior art pressure sewer systems. Thus, for instance, if a number of residences with pressure sewer systems according to the present invention are connected to a single force main, it would not generally be necessary to include a further central pumping station.

Yet a further advantage of the present invention is that, if excess pressure should develop in the pump, the pressure is simply relieved by discharge past the rolling seal, which does not impair the seal or damage the pump in any manner.

Still another advantage of the present invention is that the piston pump is very simple to repair if new seals should be required. The pump also has a very long life and does not need any special lubrication.

Still a further advantage of a system according to the present invention is that it is not subject to failure due to stuck check valves because sufficient check valves are provided so that there is redundancy whereby, even if one check valve should become clogged and sticks in the open position, the remaining check valves will enable the system to continue operating and thereby automatically permitting the clogged valve to be cleared.

The present invention, in one form thereof, comprises a pressure sewer system including a collection sump, a pump having an inlet and an outlet and an intake conduit for connecting the sump to the sump inlet. A discharge conduit is connected to the outlet. A first plurality of check valves is provided in the intake conduit and a second plurality of check valves is provided in the discharge conduit.

The present invention, in one form thereof, comprises a pressure sewer system including a piston pump. The pump includes a cylinder having an inlet and an outlet, a piston received in the cylinder, and a resilient ring rotatably received in the piston and cylinder. An intake conduit is connected to the inlet and a discharge conduit is connected to the outlet. First and second check valves are disposed in the intake conduit. Third and fourth check valves are disposed in the discharge conduit.

The present invention, in one form thereof, comprises a pressure sewer system including a piston pump. The pump includes a cylinder having an inlet and an outlet. A piston is reciprocally received in the cylinder. A resilient ring is rotatably received between the piston and cylinder. An intake conduit is connected to the inlet. A discharge conduit is connected to the outlet. First and second check valves are disposed in the intake conduit. Third and fourth check valves are disposed in the discharge conduit. The first and second check valves and the third and fourth check valves are spaced apart by predetermined distances.

An object of the present invention is to provide a pressure sewer system including a piston pump.

Another object of the present invention to provide a pressure sewer system which can provide greater discharge pressure than was possible with prior art pressure sewer systems.

Still another object of the present invention to provide a pressure sewer system wherein the pump does not need to include a comminuting or cutting element.

Yet a further object of the present invention is to provide a pressure sewer system wherein the pump is easy to repair.

Yet still a further object of the present invention is to provide a pressure sewer system wherein a sufficient number of check valves are provided to provide redundancy so that, even if one of the check valves should become clogged, the remaining check valves will continue to enable the system to operate.

BRIEF DESCRIPTION OF THE DRAWINGS

The above mentioned and other features and objects of this invention, and the manner of attaining them, will become more apparent and the invention will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
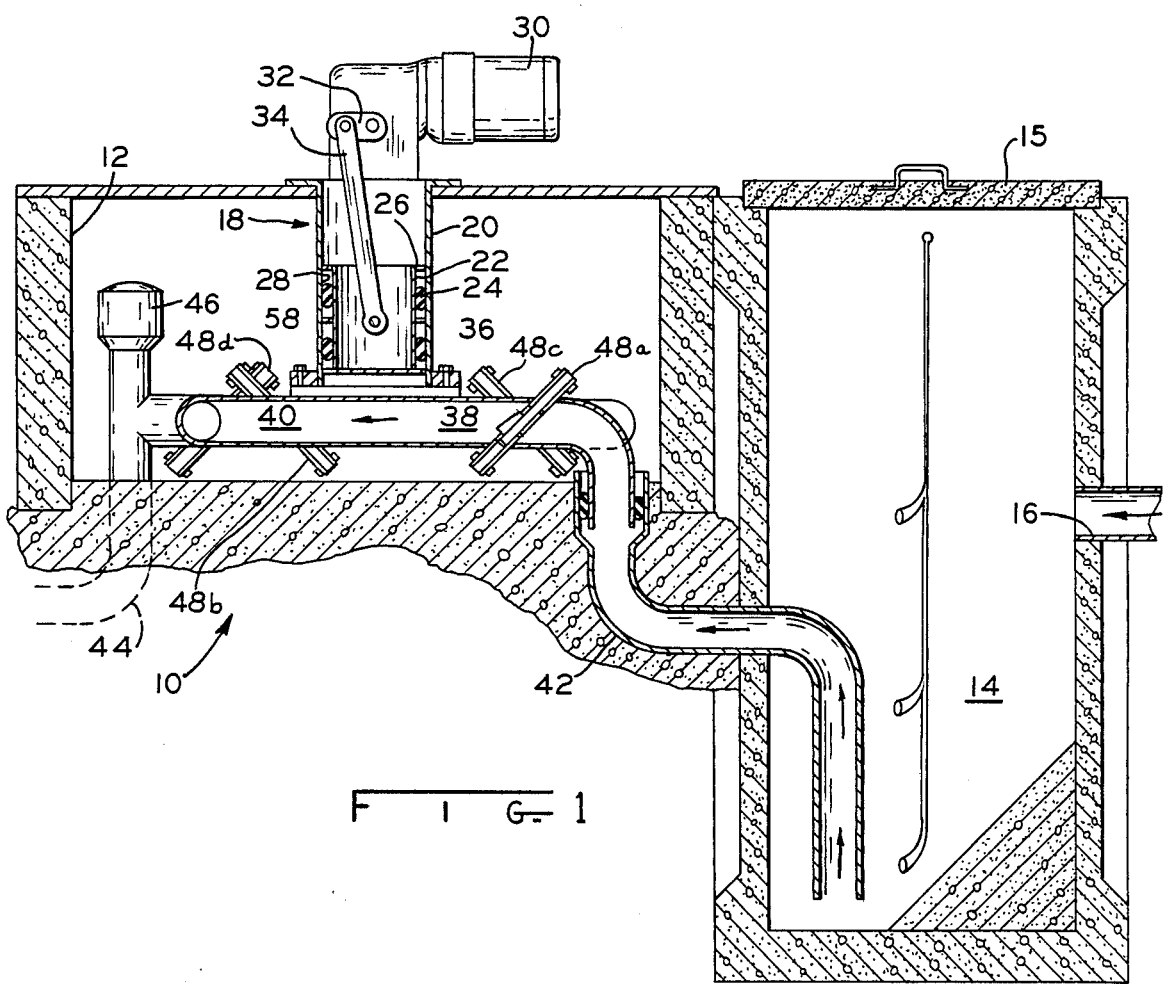
FIG. 1 is an elevational view, partially in cross section, of a pressure sewer system according to the present invention.
Figure 2:
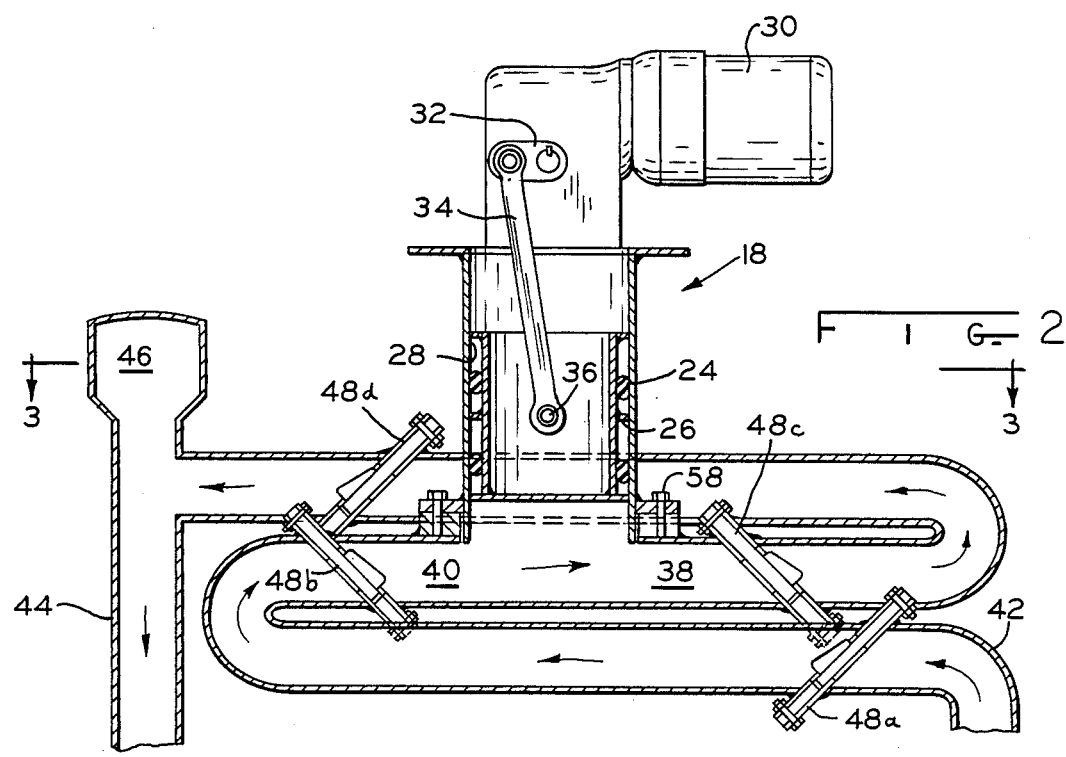
FIG. 2 is an enlarged elevational view, partially in cross section, of the pump and check valve arrangement of the embodiment of FIG. 1.
Figure 3:
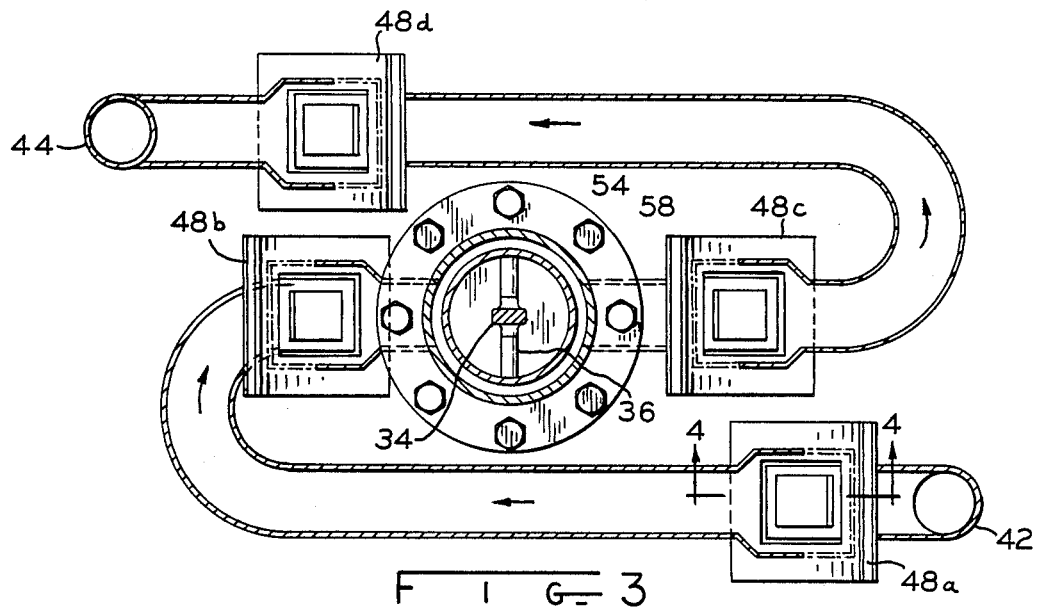
FIG. 3 is a cross sectional view taken along line 3—3 of FIG. 2.

Referring to FIG. 1 there is shown an embodiment of the pressure sewer system according to the present invention. System 10 includes a housing 12 which may be constructed of either metal, concrete or other suitable material. The housing includes a sump 14 and an inlet 12 which is connected to the sewer outlet of a residence or the like (not shown). The housing 12 may, for example, be two foot square and five feet deep and is generally buried in the soil. Pump 18 is disposed in housing 12. The pump is a piston type of pump including a cylinder 20 and a piston 22. Between the piston 22 and the wall of cylinder 20 two O-rings 24 are provided. O-rings 24 are rotatable so that they will roll as the piston 22 travels in cylinder 20 as further explained hereinafter. O-rings 24 are captured between shoulders 26a, 26b, and 26c.

Piston 22 is driven by a source of driving power herein shown as an electric motor 30. The piston may also be driven by an internal combustion engine or the like. Motor 30 drives a crank 32 which in turn is connected to piston 22 by means of a connecting rod 34 and a wrist pin 36. Pump 18 pumps sewage out of sump 14, through intake conduit 42, and pump inlet 38. The sewage is then pumped through pump outlet 40 and discharge conduit 44 to a force sewer main or to a gravity sewer main.

It should be noted that the pressure sewer system according to the present invention may be used to discharge into either a gravity fed sewer main or a pressure sewer main. It should also be noted that a plurality of pressure sewer systems according to the present invention may be connected in parallel to discharge into a sewer main.

An air cushion chamber 46 is provided on the discharge side of the pump to accommodate variations in pressure. Check valves 48a, 48b are provided on the inlet side of pump 18 and check valves 48c and 48d are provided on the outlet side of the pump.

For an explanation of a basic pressure sewer system including a piston pump, reference may be had to copending patent application, Ser. No. 323,956, entitled "PRESSURE SEWER SYSTEM", filed on even date herewith, which disclosure is incorporated herein by reference.

It should be noted that check valves 48a and 48b are separated by a predetermined distance preferably in the range of one (1) to four (4) feet. Therefore if a large piece of debris, such as a diaper or panty hose, were flushed through the sewer system, the debris would possibly keep one of the intake conduit check valves from closing but would not be able to keep both check valves 48a and 48b from closing. Thus the presence of an extra check valve 48b spaced far enough from check valve 48a provides redundancy for the system and insures that one of the check valves is always operative. Furthermore, the clogged check valve would automatically be cleared as further effluent is pumped through the valve. Similarly, discharge check valves 48c and 48d are separated by a predetermined distance, preferably in the range of one (1) to four (4) feet. Therefore, if a piece of debris should be flushed through the system, check valves 48c and 48d would not both be kept in the open position, therefore providing redundancy and fail proof operation of the pumping system.

It should also be noted that since pump 18 does not include a comminuter, large pieces of debris may be flushed through the system by the pump. This also insures that the pump will not fail due to breakdown of the cutter or comminuter element which was used in prior art grinder pressure sewer systems.

Figure 6:
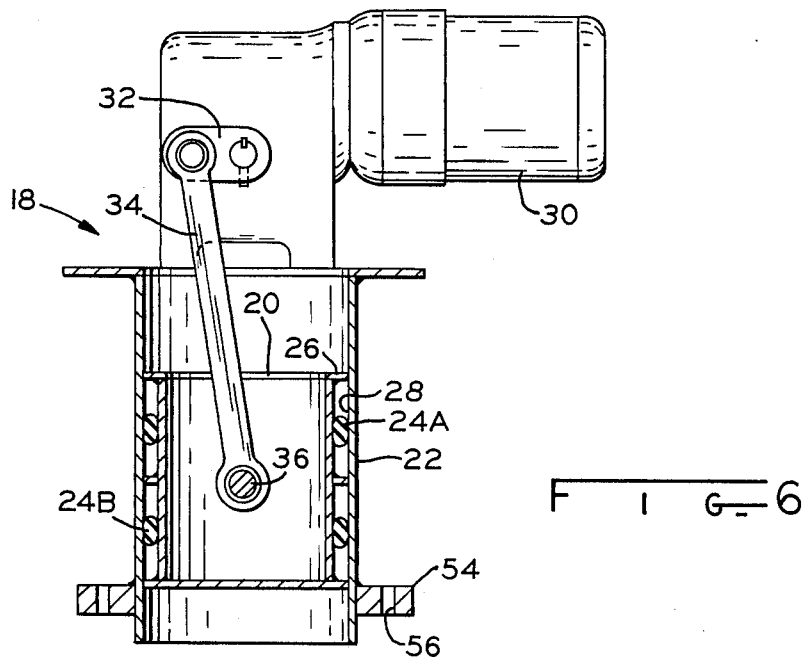
FIG. 6 is a cross sectional view of the piston pump of FIGS. 1.

As best seen in FIG. 6, O-rings 24 of pump 18 are compressed to provide a proper seal between piston 22 and cylinder 20. Each of O-rings 24 rotates in a rolling movement in a chamber 67 as piston 22 reciprocates in cylinder 20. By compressing O-rings 24 approximately 25%, sufficient head will be generated by the pump for proper operation of the system. If desired, the compression of O-rings 24 may be increased to provide for production of greater head. O-rings 24 may be constructed of a resilient flexible material such as, for instance, neoprene rubber. Since O-rings 24 roll during travel of piston 22, wear on the O-rings is much less than if the O-rings were subject to sliding friction only. If the O-rings should wear out, replacement is simple. Piston 22 merely needs to be moved upwardly out cylinder 20 and new O-rings 24 inserted.

It should also be noted that pump 18 does not need to be lubricated with lubricating oil as the moisture in the sewage will provide sufficient lubrication for the O-ring seals. If pressure in the system is excessive, pressure is relieved simply by blow-by of the O-ring seals. This does not damage the pump. Accordingly, maintenance for the pump is extremely low and the life of the pump is very long.

Figures 4, 5:
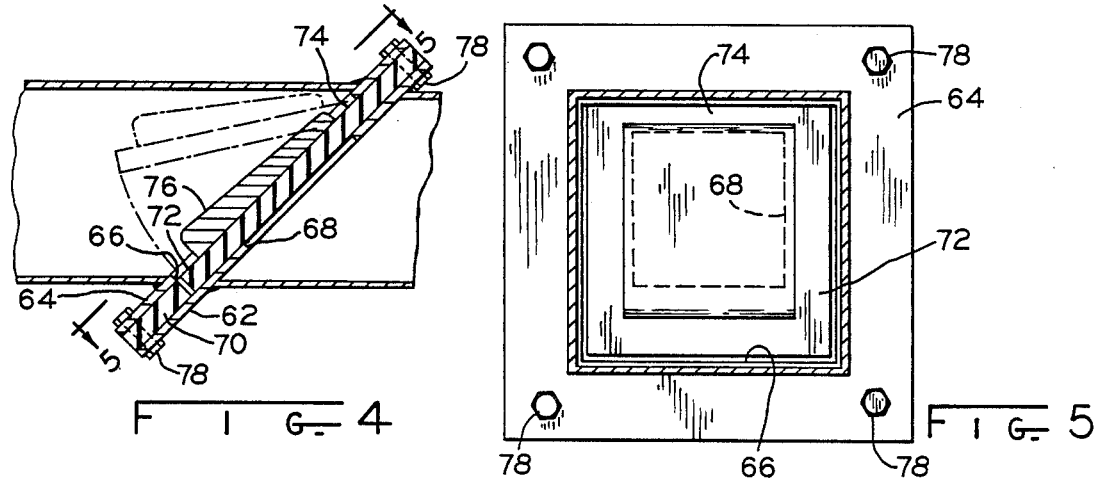
FIG. 4 is a cross sectional view of a check valve of the system of FIG. 1 taken along line 4—4 of FIG. 3.
FIG. 5 is a cross sectional view of the check valve of FIG. 4 taken along line 5—5 thereof.

The check valves 48 of the pressure sewer system 10 are best illustrated in FIGS. 4 and 5. Each check valve 48 includes a pair of rigid plates 62 and 64. Plate 62 includes a cut-out or aperture 68 and plate 64 includes a cut-out or aperture 66. Cut-out 66 is larger than cut-out 68. A sheet of resilient material 70 such as belting or neoprene rubber is captured between plates 62 and 64. Sheet 70 includes three cuts to provide a hinged flap 72 which is secured at only one edge 74. Flap 72 is smaller than aperture 66 but larger than aperture 68. Flap 72 is provided with a weight 76. As can be best seen in FIG. 4 (see dotted line representation), flap 72 can be forced open by pressure so that flap 72 passes through aperture 66, against the force of gravity provided by the weight of weight 76 and the natural resilience of the resilient sheet 70. On the other hand, if pressure on flap 72 is exerted from the left hand side thereof as seen in FIG. 4, flap 72 is forced shut against opening 68. Check valves 48a–48d are so arranged that they open in the proper direction for proper unidirectional flow of sewage through the system.

In operation, by referring to FIG. 1, the system operates as follows. When the piston 22 of pump 18 moves upwardly and draws a vacuum, valves 48a and 48b will open, thereby permitting sewage to be pumped upwardly through intake 42 conduit and through inlet 38 of pump 18. When the piston moves downwardly after the end of the upstroke, the pressure developed by the piston will close check valves 48a and 48b and will open valves 48c and 48d, thereby forcing the sewage through outlet 40 to discharge conduit 44.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A pressure sewer system comprising:
a collection sump;
a piston pump having a housing including an inlet, an outlet, and a cylinder, a piston including a plurality of circumferential shoulders and a plurality of resilient ring means, each of said resilient ring means located between a pair of adjacent said shoulders disposed in said cylinder, said resilient ring means for sealing rolling engagement with said cylinder and piston when said piston travels in said cylinder;
a serpentine intake conduit connecting said sump to said pump inlet, said intake conduit including a plurality of return bends;
a serpentine discharge conduit connected to said outlet, said discharge conduit including a plurality of return bends;
a first plurality of check valves disposed in said intake conduit, at least one of said return bends of said intake conduit positioned between each adjacent pair of said check valves; and
a second plurality of check valves disposed in said discharge conduit, at least one of said return bends of said discharge conduit positioned between each adjacent pair of said check valves.

2. The system according to claim 1 wherein said first and second pluralities of check valves each comprises two check valves.

3. The system according to claim 1 wherein each of said check valves comprises a pair of spaced apart plates having respective first and second apertures therein, said apertures being unequal in size, and a sheet of resilient material disposed between said plates.

4. The system according to claim 1 wherein said first plurality of check valves are spaced apart a predetermined distance in the range of 1 to 4 feet.

5. The system according to claim 1 wherein said second plurality of check valves are spaced apart a predetermined distance in the range of 1 to 4.

6. A pressure sewer system comprising:
a piston pump, said pump including a housing having an inlet, an outlet, and a cylinder, a piston including a plurality of circumferential shoulders and a plurality of resilient ring means, each of said resilient ring means located between a pair of adjacent said shoulders disposed in said cylinder, said resilient ring means for sealing rolling engagement with said cylinder and piston when said piston travels in said cylinder;

a serpentine intake conduit connected to said inlet, said intake conduit including a first return bend;

a serpentine discharge conduit connected to said outlet, said discharge conduit including a second return bend;

first and second check valves disposed in said intake conduit on opposite sides of said first return bend; and third and fourth check valves disposed in said discharge conduit on opposite sides of said second return bend.

7. The system according to claim 6 wherein each of said check valves comprises a pair off spaced apart plates having respective first and second apertures therein, said apertures being unequal in size, and a sheet of resilient material disposed between said plates.

8. The system according to claim 6 wherein said first and second check valves are spaced apart a predetermined distance in the range of 1 to 4 feet.

9. The system according to claim 7 wherein said third and fourth check valves are spaced apart a predetermined distance in the range of 1 to 4 feet.

10. Pressure sewer system comprising:

a piston pump, said pump including a housing having an inlet, an outlet, and a cylinder, a piston including a plurality of circumferential shoulders and a plurality of resilient ring means, each of said resilient ring means located between a pair of adjacent said shoulders disposed in said cylinder, said resilient ring for sealing rolling engagement with said cylinder and piston when said piston travels in said cylinder;

a serpentine intake conduit connected to said inlet, said intake conduit including a first return bend;

a serpentine discharge conduit connected to said outlet, said discharge conduit including a second return bend;

first and second check valves disposed in said intake conduit on opposite sides of said first return bend; and third and fourth check valves disposed in said discharge conduit on opposite sides of said second return bend;

said first and second check valves and said third and fourth check valves spaced apart by predetermined distances.

11. The system according to claim 10 wherein each of said check valves comprises a pair of spaced apart plates having respective first and second apertures therein, said apertures being unequal in size and a sheet of resilient material disposed between said plates.

12. The system according to claim 10 wherein said predetermined distances are in the range of 1 to 4 feet.

* * * * *